(12) United States Patent
Balestriere

(10) Patent No.: US 7,320,078 B2
(45) Date of Patent: Jan. 15, 2008

(54) CONTROLLING DELIVERY OF POWER AND NETWORK COMMUNICATIONS TO A SET OF DEVICES

(75) Inventor: James Balestriere, Putney (AU)

(73) Assignee: Cisco Technology, Inc., San Jose, CA (US)

( * ) Notice: Subject to any disclaimer, the term of this patent is extended or adjusted under 35 U.S.C. 154(b) by 221 days.

(21) Appl. No.: 11/145,133

(22) Filed: Jun. 3, 2005

(65) Prior Publication Data

US 2006/0277421 A1 Dec. 7, 2006

(51) Int. Cl.
*G06F 1/26* (2006.01)
(52) U.S. Cl. ...................................... 713/300; 455/402
(58) Field of Classification Search ................ 713/300
See application file for complete search history.

(56) References Cited

U.S. PATENT DOCUMENTS

| | | | | |
|---|---|---|---|---|
| 5,939,801 | A * | 8/1999 | Bouffard et al. ............... | 307/65 |
| 5,974,553 | A * | 10/1999 | Gandar ........................ | 713/300 |
| 6,473,608 | B1 * | 10/2002 | Lehr et al. ................... | 455/402 |
| 6,643,566 | B1 * | 11/2003 | Lehr et al. ................... | 700/286 |
| 6,762,675 | B1 * | 7/2004 | Cafiero et al. ............ | 340/10.42 |
| 6,859,882 | B2 | 2/2005 | Fung .......................... | 713/300 |
| 7,032,119 | B2 | 4/2006 | Fung .......................... | 713/320 |
| 7,050,840 | B2 * | 5/2006 | Lin et al. ..................... | 455/574 |
| 7,058,826 | B2 | 6/2006 | Fung .......................... | 713/300 |
| 7,155,622 | B2 * | 12/2006 | Mancey et al. ............. | 713/324 |
| 7,203,849 | B2 * | 4/2007 | Dove .......................... | 713/300 |
| 2002/0144159 | A1 * | 10/2002 | Wu et al. .................... | 713/300 |
| 2004/0037300 | A1 * | 2/2004 | Lehr et al. .................. | 370/401 |
| 2006/0112288 | A1 * | 5/2006 | Schindler .................... | 713/300 |
| 2006/0149978 | A1 * | 7/2006 | Randall et al. ............. | 713/300 |

OTHER PUBLICATIONS

Hewlett Packard, "Proliant BL e-Class—retired", http://h18004.www1.hp.com/products/servers/proliant-bl/e-class/integrated-admin.html, accessed Jul. 12, 2006.
Cyclades Corporation, "Cyclades Expands Remote Power Product Family with New Universal Power Management Unit," http://www.cyclades.com/pressroom/1107781201, published Feb. 7, 2005, accessed Jul. 12, 2006.

* cited by examiner

*Primary Examiner*—Chun Cao
(74) *Attorney, Agent, or Firm*—BainwoodHuang

(57) ABSTRACT

An improved assembly (e.g., an integrated power cycler and terminal server) controls power and communications to a set of devices. The assembly includes a network port configured to connect to a network, a set of device ports configured to connect to the set of devices through a set of power cords, and a controller coupled to the network port and to the set of device ports. The controller is configured to (i) control delivery of power from a power source to the set of devices through the set of device ports and the set of power cords, and (ii) direct conveyance of communications from the network to the set of devices through the set of device ports and the set of power cords while power is delivered to the set of devices through the set of device ports and the set of power cords.

20 Claims, 4 Drawing Sheets

CONTROLLING DELIVERY OF POWER AND NETWORK COMMUNICATIONS TO A SET OF DEVICES

BACKGROUND

It is known that a power cycler is a power supplying device which enables a user to remotely power cycle a machine if that machine becomes unresponsive during operation. Typically, the user connects the power cord of the machine to a power output port of the power cycler, and is capable of configuring the power output port of the power cycler (e.g., using remote communications over a network) to deliver power to the machine through the power cord, as well as to temporarily turn off power delivery to the machine through the power cord on command.

Some power cyclers have multiple power output ports to enable users to control power to multiple machines using the same power cycler. Such a device is particularly useful to software developers whose computerized platforms (powerable machines) occasionally transition into unresponsive states during testing and debugging of new software. Along these lines, suppose that a computerized platform becomes unresponsive while a software developer is testing and debugging a particular program. In such a situation, the software developer can simply send a command to the power cycler instructing the power cycler to power cycle the power output port for the computerized platform. Such power cycling resets the computerized platform and makes the computerized platform available again to the software developer without requiring the software developer to (i) physically travel to the computerized platform (which may be located in a different room within a building, on a different floor, or perhaps even within a different building) and (ii) manually power cycle the computerized platform in person.

It is also known that a terminal server is a communications routing device which enables users to remotely communicate with the computerized platforms through their serial console ports. Typically, the users connect respective serial communications lines of the serial console ports of the computerized platforms (e.g., RS232 serial cables) to individual communications ports of the terminal server. The users then are able to enjoy secure communications to the serial console ports of the computerized platforms (e.g., the users are capable of sending certain trusted commands to the serial console ports) without having to be at the computerized platforms in person, i.e., without having to communicate with the serial console of each computerized platform through a dedicated local terminal.

SUMMARY

Unfortunately, there are deficiencies to the above-described conventional power cycler and the above-described conventional terminal server. For example, suppose that a particular conventional system includes devices which require both (i) occasional power cycling and (ii) access through a terminal server. In such a system, the conventional power cycler typically would occupy a housing (e.g., a 1U rack mount chassis), and provide power to machines through their power cords, while the conventional terminal server typically would occupy a separate housing (e.g., a different 1U rack mount chassis) and provide communications to the machines through serial communications lines which are different than the power cords. Accordingly, if the conventional power cycler and the conventional terminal server are used at the same location (e.g., a common equipment rack), the conventional power cycler and the conventional terminal server would occupy multiple housings (e.g., a total of 2U's of space within the equipment rack), as well as separate lines (e.g., one power cord and one RS232 serial cable) to each machine. Such a situation is not an efficient use of space, and provides a relatively large number of lines for conveying power and communications.

In contrast to the above-described conventional power cycler and the above-described conventional terminal server, an improved assembly controls both power and communications to a set of devices in a relatively small footprint and with a relatively low number of lines. In particular, the assembly is capable of (i) utilizing a single housing (e.g., a single 1U tall form factor) and (ii) connecting to a set of power cords leading from the assembly to the set of devices for both power delivery (e.g., high power) and communications (e.g., trusted serial console communications). Accordingly, such an assembly is capable of providing an efficient use of space, and consuming relatively few lines for conveying power and communications contemporaneously.

One embodiment is directed to an assembly (e.g., an integrated power cycler and terminal server) for controlling power and communications to a set of devices. The assembly includes a network port configured to connect to a network, a set of device ports configured to connect to the set of devices through a set of power cords, and a controller coupled to the network port and to the set of device ports. The controller is configured to (i) control delivery of power from a power source to the set of devices through the set of device ports and the set of power cords, and (ii) direct conveyance of communications from the network to the set of devices through the set of device ports and the set of power cords while power is delivered to the set of devices through the set of device ports and the set of power cords.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

An improved assembly controls both power and communications to a set of devices in a relatively small space and with a relatively few number of lines. In particular, the improved assembly (e.g., an integrated power cycler and terminal server) is capable of (i) utilizing a single housing (e.g., a single 1U tall form factor) and (ii) connecting to a set of power cords (e.g., IEC-C14 cables) leading from the assembly to the set of devices for both power delivery (e.g., high power) and communications (e.g., trusted serial console communications). Accordingly, such an assembly is capable of providing an efficient use of space, and using relatively few lines for conveying power and communications.

Figure 1:
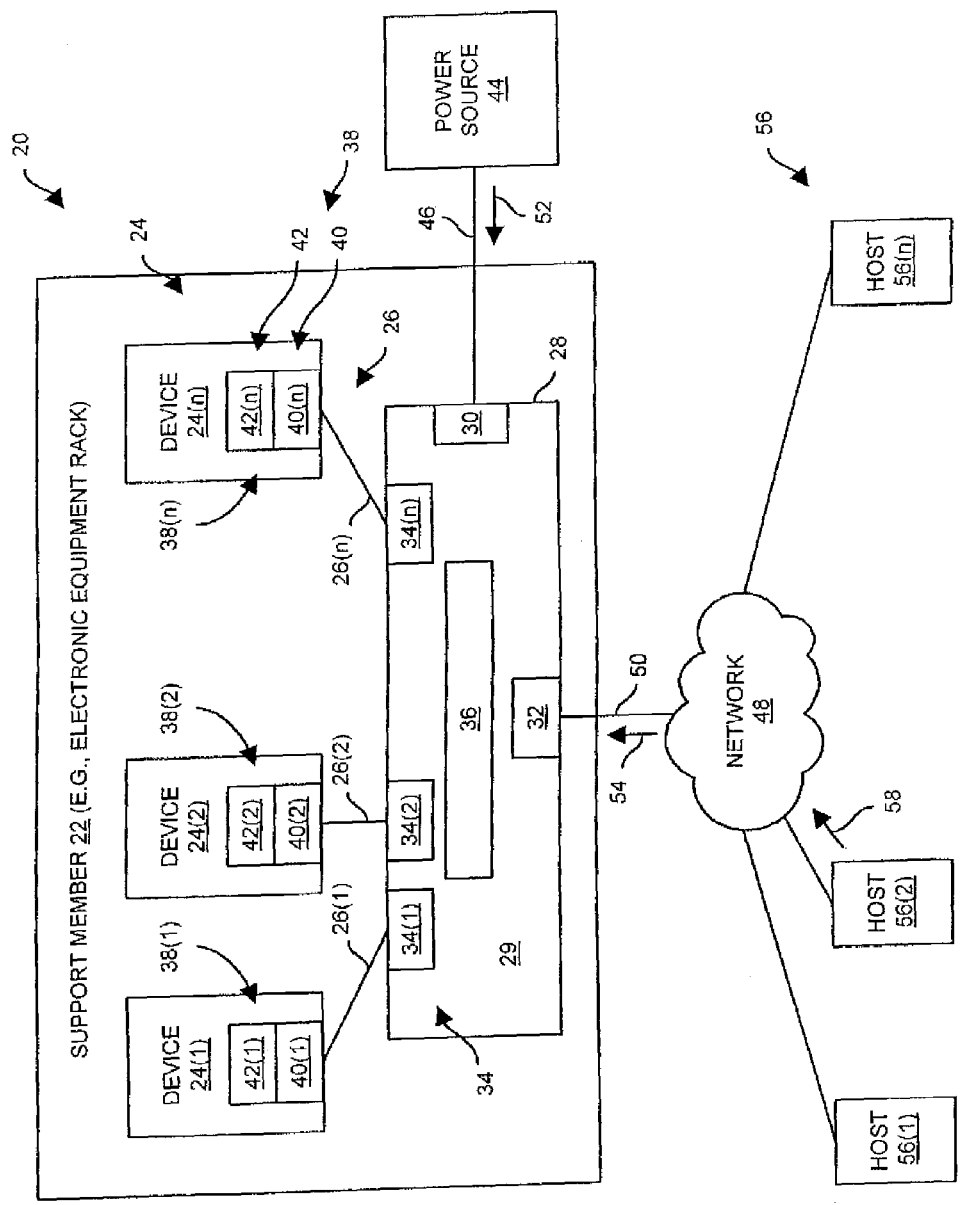
FIG. 1 is a block diagram of an electronic system configured to control power and communications to a set of devices.

FIG. 1 shows an electronic system 20 having an improved assembly for controlling power and communications to a set of devices. The electronic system 20 includes a support member 22 (e.g., an equipment rack, an electronic cabinet, and the like), a set of devices 24(1), 24(2), . . . , 24(n) (collectively, devices 24), a set of power cords 26(1), 26(2), . . . , 26(n) (collectively, power cords 26), and an assembly 28. The assembly 28 includes a housing 29 (shown generally by the reference numeral 29 in FIG. 1), a power feed interface 30, a network port 32, a set of device ports 34(1), 34(2), . . . , 34(n) (collectively, device ports 34), and a controller 36 which couples to each of the power feed interface 30, the network port 32, and the set of device ports 34. The housing 29 provides support for the power feed interface 30, the network port 32, the device ports 34, and a controller 36. In some arrangements, the housing 29 defines a compact space (e.g., a 1U form factor) which enables the assembly 29 to consume a minimal amount of height within a standard equipment rack (e.g., a standard 19-inch equipment rack).

As shown in FIG. 1, each device 24 includes an interface 38 having a power input port 40 and a power line communications (PLC) encoder/decoder 42. In particular, the device 24(1) includes an interface 38(1) having a power input port 40(1) and a PLC encoder/decoder 42(1). Similarly, the device 24(2) includes an interface 38(2) having a power input port 40(2) and a PLC encoder/decoder 42(2), and so on. Each input port 40 inputs power from an external source to circuitry within the device 24. Each PLC encoder/decoder 42 receives communications en route to the device circuitry, and transmits communications from the device circuitry through the same conductors responsible for power delivery to the device circuitry.

As further shown in FIG. 1, the power cords 26 connect the device ports 34 of the assembly 28 to the devices 24. In particular, the power cord 26(1) electrically connects the device port 34(1) with the interface 38(1) of the device 24(1). Similarly, the power cord 26(2) electrically connects the device port 34(2) of the assembly 28 with the interface 38(2) of the device 24(2), and so on.

The support member 22 (e.g., an electronic equipment rack) is configured to contemporaneously support the devices 24 and the assembly 28. The power feed interface 30 of the assembly 28 is configured to connect to an external power source 44 (e.g., a main power feed) through a power feed connection 46. Similarly, the network port 32 is configured to connect to an external network 48 through an external network connection 50.

During operation, the assembly 28 is configured to control power 52 and communications 54 to the devices 24 through the power cords 26 on behalf of a set of external network hosts 56(1), 56(2), . . . , 56(n) (collectively, hosts 56). In particular, the controller 36 of the assembly 28 is configured to deliver power 52 from the power source 44 to the set of devices 24 through the set of device ports 34 of the assembly 28 and the set of power cords 26. The controller 36 is further configured to convey communications 54 from the network 48 to the set of devices 24 through the set of device ports 34 and the set of power cords 26 while the power 52 is delivered to the set of devices 24 through the set of device ports 34 and the set of power cords 26. Due to the overlaying of the communications 54 on the same line conductors as those responsible for delivering power 52, there is a common power and communications path to each device 24.

In some arrangements, each power cord 26 is a standard IEC-C14 compliant power cable as set by the International Electrotechnical Commission (IEC), or the engineering equivalent. In contrast to low-power cables which are designed to deliver phantom power through differential signal pairs (e.g., Cat 5 cables), such a IEC-C14 compliant power cable is well-suited for delivering relatively high power (i.e., a power supply signal of at least 110 Volts/AC and at least 50 Hertz) to a respective, local, rack-mounted processing device 24 through a hot leg (e.g., the black wire) and a return leg (e.g., the white wire).

In some arrangements, the devices 24 treat the communications 54 through the power cords 26 as serial console port communications which are secure/trusted. Accordingly, the assembly 28 enables remote serial console port access to the devices 24 with less physical lines leading to the devices 24 vis-à-vis conventional setups which have separate power cords and serial console cables to each machine. Accordingly, the system 20 provides a lower cable management burden on the user.

By way of example only, suppose that the electronic system 20 is a rack-mount software development system on which software developers develop and test software programs where the support member 22 is an electronic equipment rack, and where the housing 29 of the assembly 28 has a 1U tall form factor. Further suppose that the devices 24 are individual processing circuits which are capable of running one or more software programs under test. For example, suppose that a user at the host 56(2) is exchanging console port communications 54 with the device 24(2) (i.e., a processing circuit) through the power supply conductors of the power cord 26(2) in order to debug a new version of an operating system running on the device 24(2).

Now suppose that the device 24(2) becomes unresponsive after a period of time running the new version of the operating system. At this point, the user at the host 56(2) does not need to travel to the unresponsive device 24(2) and manually power cycle the device 24(2). Rather, the user is capable of communicating with the assembly 28 through the network 48 to power cycle the unresponsive device 24(2). In particular, the user simply sends a command 58 from the host 56(2) to the assembly 28 directing the assembly 28 to power cycle the device 24(2). In response to the command 58, the controller 36 disconnects power 52 from the device 24(2) and reconnects power 52 to the device 24(2). In turn, the device 24(2) reloads itself and becomes operational again for analysis and/or a subsequent test without inconveniencing the user to manually reset the device 24(2) in person. Moreover, the assembly 28 is capable of residing in a 1U tall form factor for efficient use of space, and with only a single cable (one power cord 26) running to each device 24 for both power delivery and communications. In particular, the power supply conductors of the power cord 26(2) provide both a power path and a communications path between the assembly 28 and the device 24(2). Further details will now be provided with reference to FIG. 2.

Figure 2:
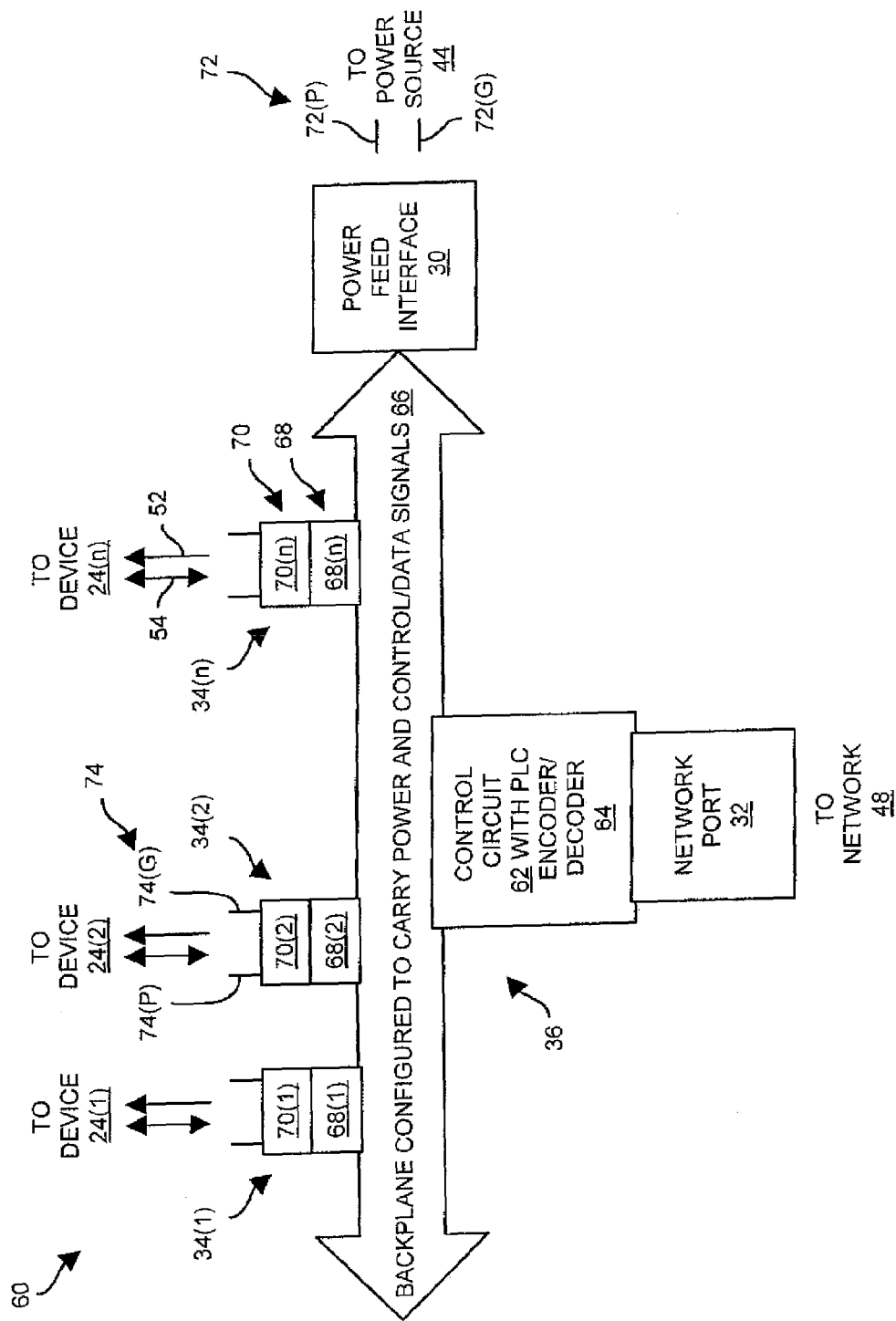
FIG. 2 is a block diagram of a portion of the electronic system of FIG. 1 in accordance with a first embodiment.

FIG. 2 is a block diagram of a portion 60 of the electronic system 20 in accordance with a first embodiment. As shown in FIG. 2, the controller 36 includes a control circuit 62 having a PLC encoder/decoder 64, and a backplane 66 which is configured to carry power signals (i.e., power 52) and data signals (i.e., communications 54) on the same conductors (e.g., power and ground planes). These conductive planes of the backplane 66 couple to the power feed interface 30, to the device ports 34, to the control circuit 62. The control circuit 62 is interconnected between the network port 32 and the backplane 66.

As further shown in FIG. 2, each device port 34 includes a power relay 68 and a power output port 70. In particular, the device port 34(1) includes a power relay 68(1) and a power output port 70(1). Similarly, the device port 34(2) includes a power relay 68(2) and a power output port 70(2), and so on.

During operation, the control circuit 62 controls the operation of the power relays 68 in order to deliver or stop delivery of power 52 to the devices 24 individually. For example, to deliver power 52 to the device 24(2), the control circuit 62 sends a control signal to the power relay 68(2) directing the power relay 68(2) to close. In response, the power relay 68(2) closes thus connecting a pair of terminals 72 of the power source 44 (i.e., a power terminal 72(P) and a ground terminal 72(G)) to a pair of conductor 74 of the power output port 70(2) (i.e., a power conductor 74(P) and a ground conductor 74(G)). As a result, the various components form an electrical power pathway between the power terminal 72(P) of the power source 44 and the power conductor 74(P) of the device port 34(2), and an electrical ground pathway between the ground terminal 72(G) and the ground conductor 74(G). Thus, the assembly 28 delivers power 52 to the device 24(2) (e.g., a nominal power signal of at least 110 Volts at a frequency of at least 50 Hertz). In some arrangements, the power 52 is available as a common nominal 110 Volt AC, 60 Hertz signal in compliance with standard electrical requirements in the United States of America.

As another example, to stop delivery of power 52 to the device 54, the control circuit 62 sends a control signal to the power relay 68(2) directing the power relay 68(2) to open. In response, the power relay 68(2) disconnects the pair of terminals 72 from the pair of terminals 74 thus breaking the power pathway to the device 54. The control circuit 62 can then send another control signal to the power relay 68(2) directing the power relay 68(2) to close again to complete the power cycle. Furthermore, the control circuit 62 can open and close other power relays 68 to power cycle other devices 24 as well.

It should be understood that, concurrently with the power delivering/cycling operation of the assembly 28, the control circuit 62 is equipped with a PLC encoder/decoder 64 that enables the backplane 66 to carry the communications 54 on the same set of backplane conductors (e.g., power and ground planes, etc.). The PLC encoder/decoder 64 is capable of adding the communications 54 to the same conductors using a variety of non-disruptive techniques (e.g., frequency modulation, amplitude modulation, and the like). In particular, the PLC encoder/decoder 64 conveniently incorporates the communications 54 onto the backplane power conductors and the PLC encoder/decoders 42 of the devices 24 enabling the devices 24 to treat such communications 54 as serial console communications. Similarly, the encoder/decoders 42 of the devices 24 conveniently incorporate the communications 54 in the return direction, and the PLC encoder/decoder 64 of the control circuit 62 effectively treats such communications 54 as serial console responses from the devices 24.

Accordingly, the power and ground conductors of the backplane 66 operate as a broadcast bus. This configuration is simple and utilizes communications bandwidth through the existing power and ground conductors backplane 66. As a result of the above, the communications 54 are essentially in the form of common power line communications signals which are receivable by all devices 54 (e.g., in a multiplexed manner, at a specific frequency/channel, using specific device addresses/identifiers, etc.). That is, every device 24 is capable of seeing all of the communications 54 for every other device 24. Nevertheless, such communications 54 are highly trusted due to security and authentication imposed by the assembly 28 to all external hosts 56. Further details will now be provided with reference to FIG. 3.

Figure 3:
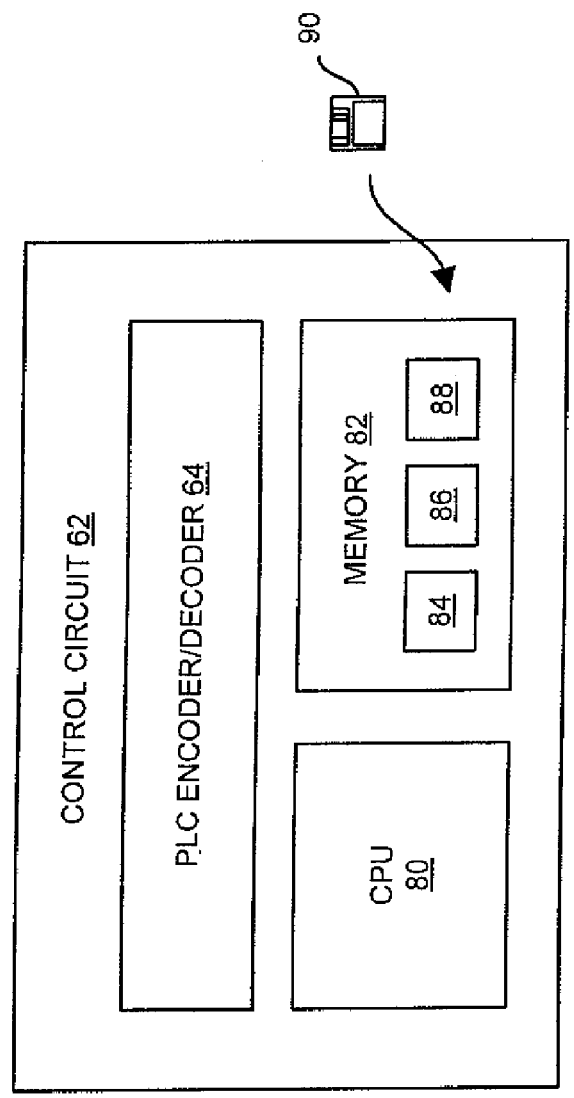
FIG. 3 is a block diagram of a control circuit of the portion of the electronic system of FIG. 2.

FIG. 3 shows a block diagram of the control circuit 62 of the assembly 28. In addition to the PLC encoder/decoder 64 (also see FIG. 2), the control circuit 62 further includes a central processing unit (CPU) 80, and memory 82 coupled to the CPU 80. The memory 82 stores terminal server code 84, power cycler code 86, and control information 88. These memory constructs 84, 86, 88 together, or individually, are deliverable to the memory 82 via a computer program product 90. Although the computer program product 90 is illustrated as a diskette by way of example only, a variety of communications and storage media are suitable for use (e.g., a set of CD-ROMs, tapes, memory cards or sticks, network downloads, propagated signals, combinations thereof, etc.

During operation, the CPU 80 runs in accordance with the terminal server code 84 and the power cycler code 86. In particular, when the CPU 80 executes the terminal server code 84, the CPU 80 operates as a terminal server providing terminal access to the set of devices 24. That is, the CPU 80 routes communications 54 between the hosts 56 and the devices 24 through conductors of the power cords 26 (FIGS. 1 and 2). Along these lines, the CPU 80 directs the encoder/decoder 64 to (i) overlay and address the communications 54 from the external network hosts 56 (FIG. 1) onto the backplane 66 (FIG. 2) for receipt to by specific devices 24, and (ii) extract communications 54 from the backplane 66 sent by the devices 24 to the external network hosts 56 for proper routing back to specific hosts 56. In some arrangements, the control information 88 maps addresses and passwords to the devices 24 to enable robust routing and authentication of the communications 54 passing between the hosts 56 and the devices 24.

Similarly, when the CPU 80 executes the power cycler code 86, the CPU 80 operates as a power cycler enabling power cycling of the set of devices 24 on behalf of the hosts 56. That is, the CPU 80 opens and closes particular power relays 68 (FIG. 2) to control delivery of power 52 to the devices 24 in response to commands 58 from the hosts 56. Along these lines, the CPU 80 closes specific power relays 68 to provide power 52 to specific devices 24, and cycles (i.e., opens and subsequently closes) power relays 68 to power cycle devices 24 requiring reloading by way of power cycling (e.g., to reset a non-responsive device 24).

It should be understood that the CPU 80 is capable of power cycling devices 24 in a variety of manners. For example, the CPU 80 is capable of power cycling devices 24 in response to direct commands from the hosts 56. In particular, when the CPU 80 receives a power cycle command 58 to power cycle a particular device 24 from a host 56, the CPU 80 responds to the power cycle command 58 by opening and closing the power relay 68 of the device port 34 connected to that device 24. When the power relay 68 opens, the power relay 68 turns off delivery of power 52 to that device 24 through the device port 34 and the associated power cord 26 (FIGS. 1 and 2). When the power relay 68 closes again, the power relay 68 turns on delivery of power 52 to the device 24 through the device port 24 and the power cord 26 thus resetting the device 24.

As another example, the CPU 80 is capable of power cycling devices 24 in response to an automated schedule defined by the control information 88 stored in the memory 82 (FIG. 3). Here, a user initially configures the control information 88 to periodically turn off certain devices 24 to conserve power. In particular, the user sends a command 58 to the CPU 70 directing the CPU 80 to run in accordance with schedule defined by the control information 88. In response, a timer process (or thread) running on the CPU 80 generates a signal periodically to direct a power cycler process running on the CPU 80 to turn off certain devices 24 (e.g., during off-peak hours when there is less demand on processing capacity from the devices 24). When the power cycler process running on the CPU 80 receives this periodic timer signal, the CPU 80 turns off delivery of power 52 to these certain devices 24 (i.e., by opening the associated power relays 68). Similarly, the schedule defined by the control information 88 determines when to return power delivery to the powered-down devices 24. In particular, the timer process running on the CPU 80 generates a new signal to direct the power cycler process running on the CPU 80 to turn on these devices 24 (e.g., at the expiration of off-peak hours when demand on processing capacity from the devices 24 increases). Accordingly, the CPU 80 is capable of robustly managing power consumption of the electronic system 20 on a periodic basis. Further details will now be provided with reference to FIG. 4.

Figure 4:
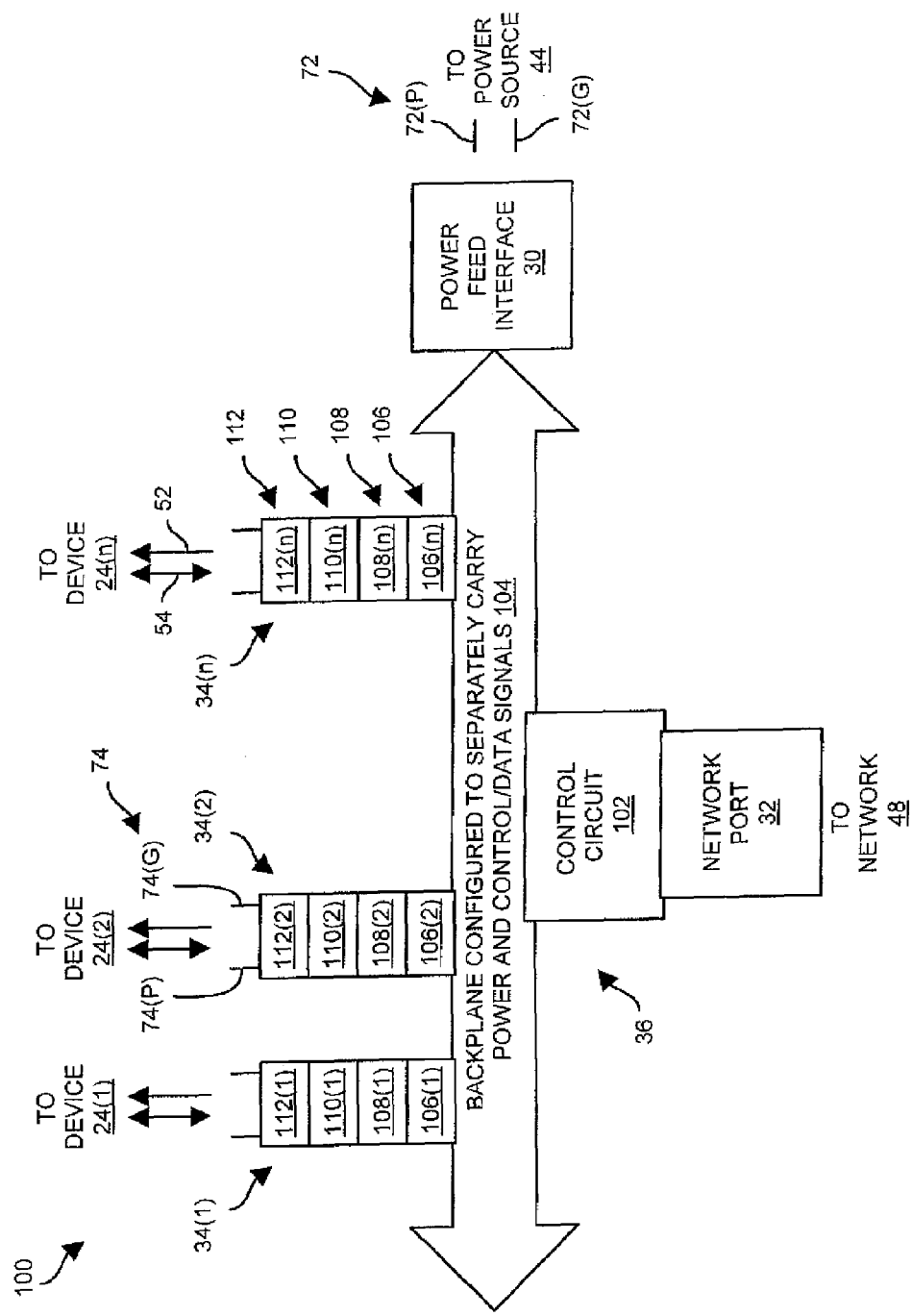
FIG. 4 is a block diagram of a portion of the electronic system of FIG. 1 in accordance with an alternative embodiment.

FIG. 4 is a block diagram of a portion 100 of the electronic system 20 in accordance with a second embodiment which is an alternative to the first embodiment (also see FIG. 2). As shown in FIG. 4, the controller 36 includes a control circuit 102, and a backplane 104 which is configured to carry both power signals (i.e., power 52) and data signals (i.e., communications 54) but on isolated conductors. In particular, the communications 54 travel on signal traces which are separate from power and ground planes carrying the power signals. These various conductive structures of the backplane 104 appropriately couple to the power feed interface 30, to the device ports 34, to the control circuit 102. The control circuit 102 is interconnected between the network port 32 and the backplane 104.

As further shown in FIG. 4, each device port 34 includes a power relay 106, a low pass filter 108, a PLC encoder/decoder 110 and a power output port 112. In particular, the device port 34(1) includes a power relay 106(1), a low pass filter 108(1), a PLC encoder/decoder 110(1) and a power output port 112(1). Similarly, the device port 34(2) includes a power relay 106(2), a low pass filter 108(2), a PLC encoder/decoder 110(2) and a power output port 112(2), and so on.

It should be understood that the control circuit 102 is similar to the control circuit 62 (also see FIGS. 2 and 3) except that the control circuit 102 does not require a PLC encoder/decoder. The control circuit 102 still preferably utilizes a CPU and memory to run terminal server code and power cycler code as described above in connection with the control circuit 62 (FIG. 3).

During operation, the control circuit 102 controls the operation of the power relays 106 in a manner similar to that described above for the first embodiment. In particular, the control circuit 102 opens and closes the power relays 106 to connect and disconnect the power and ground terminals 72(P), 72(G) of the power source 44 (collectively, power source terminals 72) and the power and ground conductors 74(P), 74(G) (collectively, conductors 74) of the power output ports 112.

Additionally, through separate signal traces of the control circuit 102 sends the communications 54 to the device ports 34. The PLC encoder/decoders 100 are capable of adding the communications 54 to the power signal conductors of the power cords 26 (FIG. 1) using a variety of non-disruptive techniques (e.g., frequency modulation, amplitude modulation, and the like). In turn, the encoder/decoders 42 of the devices 24 conveniently extract such signals en route to the devices 24, as well as incorporate additional communications 54 in the return direction for extraction by the PLC encoder/decoders 100 of the device ports 34. The low pass filters 108 of the device ports 34 properly condition the lines to filter out noise in the power signal 52 as well as isolate the specific communications 54 traveling through each device port 34 and each power cord 26 from the other device ports 34 and other power cords 26. Such a configuration enables maximum utilization of the bandwidth through each power cord 26.

As a result of the above, the communications 54 are essentially in the form of respective power line communications signals which are individually receivable by each device 24. Accordingly, each device 24 enjoys 100% of the communications bandwidth through its associated power cord 26. Such a configuration provides a very high level of security due to isolation of the respective communications 54 to only the specific device port 34, the specific power cord 26 and the specific device 24.

As described above, an improved assembly 28 is capable of controlling both power and communications to a set of devices 24 in a relatively small space and with a relatively few number of lines. In particular, the improved assembly 24 is capable of (i) utilizing a single housing (e.g., a single 1U tall form factor) and (ii) connecting to a set of power cords 26 (e.g., IEC-C14 cables) leading from the assembly to the set of devices 24 for both power delivery (e.g., high power) and communications (e.g., trusted serial console communications). Accordingly, such an assembly 28 is capable of providing an efficient use of space, and using relatively few lines for conveying power 52 and communications 54.

While this invention has been particularly shown and described with references to preferred embodiments thereof, it will be understood by those skilled in the art that various changes in form and details may be made therein without departing from the spirit and scope of the invention as defined by the appended claims.

For example, the assembly 28 (FIG. 1) was described above as being configured to control power 52 and communications 54 for multiple devices 24(1), 24(2), . . . 24(n). It should be understood that "n" is capable of being any positive integer, e.g., 1, 2, 4, 6, 8, 10, 12, etc.

Additionally, it should be understood that the system 20 was described above as being a software development platform for software developers by way of example. The improved assembly 28 is well-suited for other applications as well such as server environments which would benefit by running with fewer devices 24 and at less power during certain times (e.g., during off-peak hours). Such enhancements and modifications are intended to belong to various embodiments.

What is claimed is:

1. An electronic system, comprising:
a set of devices;
a set of power cords; and
an assembly configured to control power and communications to the set of devices through the set of power cords, the assembly including:
a network port configured to connect to a network,
a set of device ports connected to the set of devices through the set of power cords, and a controller coupled to the network port and to the set of device ports, the controller being configured to:
control delivery of power from a power source to the set of devices through the set of device ports and the set of power cords, and
direct conveyance of communications from the network to the set of devices through the set of device ports and the set of power cords while power is delivered to the set of devices through the set of device ports and the set of power cords;
wherein the controller of the assembly includes:
memory which stores terminal server code and power cycler code; and
a common central processing unit coupled to the memory, the common central processing unit being configured to operate as a terminal server providing terminal access to the set of devices while running the terminal server code, and as a power cycler enabling power cycling of the set of devices on behalf of a set of external network hosts of the network while running the power cycler code.

2. The electronic system as in claim 1, further comprising:
a common equipment rack which supports the assembly and the set of devices; and
wherein the central processing unit, when operating as the power cycler, is configured to:
receive a power cycle command from a network host through the network port, the network host being external to the electronic system, and
in response to the power cycle command, (i) turn off delivery of power to a device through a device port and a power cord and subsequently (ii) turn on delivery of power to the device through the device port and the power cord to reset the device.

3. The electronic system as in claim 1, further comprising:
a common equipment rack which supports the assembly and the set of devices; and
wherein the central processing unit, when operating as the power cycler, is configured to:
receive a periodic timer signal, and
in response to the periodic timer signal, periodically turn off delivery of power to a device through a device port and a power cord for a predefined amount of time, and subsequently turn on the delivery of power to the device through the device port and the power cord to manage power consumption of the electronic system on a periodic basis.

4. The electronic system as in claim 1 wherein each device port of the assembly includes a ground conductor and a power conductor; wherein the power source includes a ground terminal and a power terminal; and wherein the central processing unit, when operating as the power cycler, is configured to:
provide an electrical ground pathway between the ground terminal of the power source and the ground conductor of a device port, and an electrical power pathway between the power terminal of the power source and the power conductor of the device port to deliver power to a device which connects to the device port through a power cord, the electrical ground and power pathways being configured to convey a nominal power signal of at least 110 Volts at a frequency of at least 50 Hertz.

5. The electronic system as in claim 4 wherein one of the controller and the device port further includes:
a power line communications encoder/decoder circuit configured to incorporate a power line communications signal with the nominal power signal to provide power and network communications from the network host through the power cord to the device.

6. The electronic system as in claim 1 wherein the controller further includes:
a power line communications encoder/decoder circuit configured to incorporate a common power line communications signal with a nominal power signal provided by the power source for distribution of the common power line communications signal and the nominal power signal through each of the set of device ports.

7. The electronic system as in claim 1 wherein each device port includes:
a power line communications encoder/decoder circuit configured to incorporate a respective power line communications signal with a nominal power signal provided by the power source for distribution of the respective power line communications signal solely through that device port in an isolated manner together with distribution of the nominal power signal.

8. The electronic system as in claim 1, further comprising:
a common equipment rack which supports the assembly and the set of devices; and
wherein the set of devices includes multiple software test platforms to form at least a portion of a computerized software testing system.

9. The electronic system as in claim 1 wherein the assembly further includes a housing support which is arranged to support the network port, the set of device ports and the controller, the housing support defining a substantially 1U tall form factor.

10. An assembly for controlling power and communications to a set of devices, the assembly comprising:
a network port configured to connect to a network;
a set of device ports configured to connect to the set of devices through a set of power cords; and
a controller coupled to the network port and to the set of device ports, the controller being configured to:
control delivery of power from a power source to the set of devices through the set of device ports and the set of power cords, and
direct conveyance of communications from the network to the set of devices through the set of device ports and the set of power cords while power is delivered to the set of devices through the set of device ports and the set of power cords;
wherein the controller includes:
memory which stores terminal server code and power cycler code, and
a common central processing unit coupled to the memory, the common central processing unit being configured to operate as a terminal server providing terminal access to the set of devices while running the terminal server code, and as a power cycler enabling power cycling of the set of devices on behalf of a set of external network hosts of the network while running the power cycler code.

11. The assembly as in claim 10 wherein the assembly and the set of devices reside on a common equipment rack to form at least a portion of an electronic system; and wherein the central processing unit, when operating as the power cycler, is configured to:
receive a power cycle command from a network host through the network port, the network host being external to the electronic system, and in response to the power cycle command, (i) turn off delivery of power to a device through a device port and a power cord and subsequently (ii) turn on delivery of power to the device through the device port and the power cord to reset the device.

12. The assembly as in claim 10 wherein the assembly and the set of devices reside on a common equipment rack to form at least a portion of an electronic system; and wherein the central processing unit, when operating as the power cycler, is configured to:
  receive a periodic timer signal, and
  in response to the periodic timer signal, periodically turn off delivery of power to a device through a device port and a power cord for a predefined amount of time, and subsequently turn on the delivery of power to the device through the device port and the power cord to manage power consumption of the electronic system on a periodic basis.

13. The assembly as in claim 10 wherein each device port includes a ground conductor and a power conductor; wherein the power source includes a ground terminal and a power terminal; and wherein the central processing unit, when operating as the power cycler, is configured to:
  provide an electrical ground pathway between the ground terminal of the power source and the ground conductor of a device port, and an electrical power pathway between the power terminal of the power source and the power conductor of the device port to deliver power to a device which connects to the device port through a power cord, the electrical ground and power pathways being configured to convey a nominal power signal of at least 110 Volts at a frequency of at least 50 Hertz.

14. The assembly as in claim 13 wherein one of the controller and the device port further includes:
  a power line communications encoder/decoder circuit configured to incorporate a power line communications signal with the nominal power signal to provide power and network communications from the network host through the power cord to the device.

15. The assembly as in claim 10 wherein the controller further includes:
  a power line communications encoder/decoder circuit configured to incorporate a common power line communications signal with a nominal power signal provided by the power source for distribution of the common power line communications signal and the nominal power signal through each of the set of device ports.

16. The assembly as in claim 10 wherein each device port includes:
  a power line communications encoder/decoder circuit configured to incorporate a respective power line communications signal with a nominal power signal provided by the power source for distribution of the respective power line communications signal solely through that device port in an isolated manner together with distribution of the nominal power signal.

17. The assembly as in claim 10 wherein the set of devices includes multiple software test platforms; and wherein the assembly and the multiple software test platforms reside on a common equipment rack to form at least a portion of a computerized software testing system.

18. The assembly as in claim 10, further comprising:
  a housing support which is arranged to support the network port, the set of device ports and the controller, the housing support defining a substantially 1U tall form factor.

19. An assembly for controlling power and communications to a set of devices, the assembly comprising:
  a network port configured to connect to a network;
  a set of device ports configured to connect to a set of devices through a set of power cords; and
  control means, coupled to the network port and to the set of device ports, for (i) controlling delivery of power from a power source to the set of devices through the set of device ports and the set of power cords, and (ii) directing conveyance of communications from the network to the set of devices through the set of device ports and the set of power cords while power is delivered to the set of devices through the set of device ports and the set of power cords;
  wherein the control means includes:
    means for storing terminal server code and power cycler code, and
    means, coupled to the memory, for operating (i) as a terminal server providing terminal access to the set of devices while running the terminal server code, and (ii) as a power cycler enabling power cycling of the set of devices on behalf of a set of external network hosts of the network while running the power cycler code.

20. The assembly as in claim 19, further comprising:
  a housing support which is arranged to support the network port, the set of device ports and the control means, the housing support defining a substantially 1U tall form factor.

* * * * *